(12) United States Patent
Dadu et al.

(10) Patent No.: US 9,577,784 B2
(45) Date of Patent: *Feb. 21, 2017

(54) SYSTEM, DEVICE, AND METHOD FOR SECURING VOICE AUTHENTICATION AND END-TO-END SPEECH INTERACTION

(71) Applicant: Intel Corporation, Santa Clara, CA (US)

(72) Inventors: Saurabh Dadu, Tigard, OR (US); Karthik K. Rishi, Portland, OR (US); Gyan Prakash, Beaverton, OR (US); Rajesh Poornachandran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/826,078

(22) Filed: Aug. 13, 2015

(65) Prior Publication Data
US 2015/0349913 A1 Dec. 3, 2015

Related U.S. Application Data

(63) Continuation of application No. 13/631,278, filed on Sep. 28, 2012, now Pat. No. 9,124,386.

(51) Int. Cl.
*G06F 21/62* (2013.01)
*H04K 1/00* (2006.01)

(52) U.S. Cl.
CPC ............... *H04K 1/00* (2013.01); *G06F 21/62* (2013.01)

(58) Field of Classification Search
None
See application file for complete search history.

(56) References Cited

U.S. PATENT DOCUMENTS

| 5,953,700 A * | 9/1999 | Kanevsky | G10L 15/30 704/270.1 |
| 6,085,024 A * | 7/2000 | Kakiuchi | G11B 19/02 348/E5.042 |
| 6,289,455 B1 * | 9/2001 | Kocher | G06F 21/10 380/228 |
| 6,490,513 B1 * | 12/2002 | Fish | G07C 5/008 340/439 |
| 6,529,602 B1 * | 3/2003 | Walker | H04K 1/00 379/67.1 |

(Continued)

*Primary Examiner* — Michael R Vaughan
*Assistant Examiner* — Richard McCoy
(74) *Attorney, Agent, or Firm* — Barnes & Thornburg LLP

(57) ABSTRACT

A method, device, and system for secure end-to-end audio recognition is disclosed. A client device launches an application that connects with a server. The client device and server exchange cryptographic keys and establish a secure connection and a shared cryptographic key. The server transmits an encrypted audio prompt to the client device. The client device decrypts the encrypted audio prompt and stores the decrypted audio prompt in secure memory inaccessible to the operating system using an audio engine of the client device. The audio engine then retrieves the audio and renders it for the user through the speakers of the client device. The client device captures the user's audio response with a microphone and stores the audio response in the secure memory. The stored audio response is encrypted and transmitted to the server.

20 Claims, 6 Drawing Sheets

(56) References Cited

U.S. PATENT DOCUMENTS

| | | | |
|---|---|---|---|
| 7,003,501 B2* | 2/2006 | Ostroff | G06Q 20/06 380/30 |
| 7,237,717 B1* | 7/2007 | Rao | G07C 13/00 235/386 |
| 7,716,133 B1* | 5/2010 | Foote | G06Q 20/1085 705/43 |
| 7,873,350 B1* | 1/2011 | McDaniel | H04L 63/0281 379/112.01 |
| 8,260,262 B2* | 9/2012 | Ben Ayed | G08B 13/1436 455/41.2 |
| 2002/0029258 A1* | 3/2002 | Mousseau | G06Q 10/107 709/218 |
| 2004/0077375 A1* | 4/2004 | Fang | H04W 4/00 455/557 |
| 2004/0171399 A1* | 9/2004 | Uchida | H04W 12/02 455/514 |
| 2005/0212943 A1* | 9/2005 | Karasaki | H04N 1/00143 348/333.02 |
| 2009/0049307 A1* | 2/2009 | Lin | G06F 21/72 713/185 |
| 2009/0125429 A1* | 5/2009 | Takayama | G06Q 20/04 705/35 |
| 2011/0162082 A1* | 6/2011 | Paksoy | G06F 21/78 726/26 |
| 2012/0115584 A1* | 5/2012 | Nguyen | G07F 17/323 463/25 |
| 2013/0019154 A1* | 1/2013 | Wolfston, Jr. | G06Q 10/00 715/221 |
| 2013/0096916 A1* | 4/2013 | Pemmaraju | G06F 21/32 704/235 |
| 2013/0132091 A1* | 5/2013 | Skerpac | G10L 17/005 704/273 |
| 2013/0217364 A1* | 8/2013 | Varoglu | H04L 67/24 455/414.1 |
| 2013/0219166 A1* | 8/2013 | Ristov | H04L 63/0853 713/151 |
| 2013/0232578 A1* | 9/2013 | Chevallier-Mames | G06F 21/10 726/26 |

* cited by examiner

SYSTEM, DEVICE, AND METHOD FOR SECURING VOICE AUTHENTICATION AND END-TO-END SPEECH INTERACTION

CROSS-REFERENCE TO RELATED APPLICATIONS

This application is a continuation application of U.S. application Ser. No. 13/631,278, entitled "System, Device, and Method for Securing Voice Authentication and End-to-End Speech Interaction," which was filed on Sep. 28, 2012.

BACKGROUND

Mobile phones and tablets are becoming increasingly used to run a variety of applications and overtaking roles formerly dedicated solely to traditional computing devices. In lockstep with the burgeoning use of such mobile devices, biometric and hands-free mechanisms to interact with the devices, such as audio recognition, continue to be developed. For example, Bluetooth and other short-range wireless technologies allow users to communicate without being tethered to the communication device. Similarly, audio and speech recognition systems permit a user to direct a device to perform some action via spoken commands.

With the advent of speech recognition systems, software developers have begun to incorporate audio passphrase recognition into multi-factor authentication systems. As such, it can be important that the audio transmitted to the passphrase recognition system is secure. Various audio security mechanisms have been developed. For example, audio digital rights management (DRM) systems have been developed to secure pre-recorded and encrypted audio. Similarly, hardware reinforced audio protection mechanisms such as Protected Audio Video Path (PAVP) have been developed. However, each of those mechanisms is directed to pre-recorded audio. As such, live audio captured via a microphone may be insecure and prone to attack.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
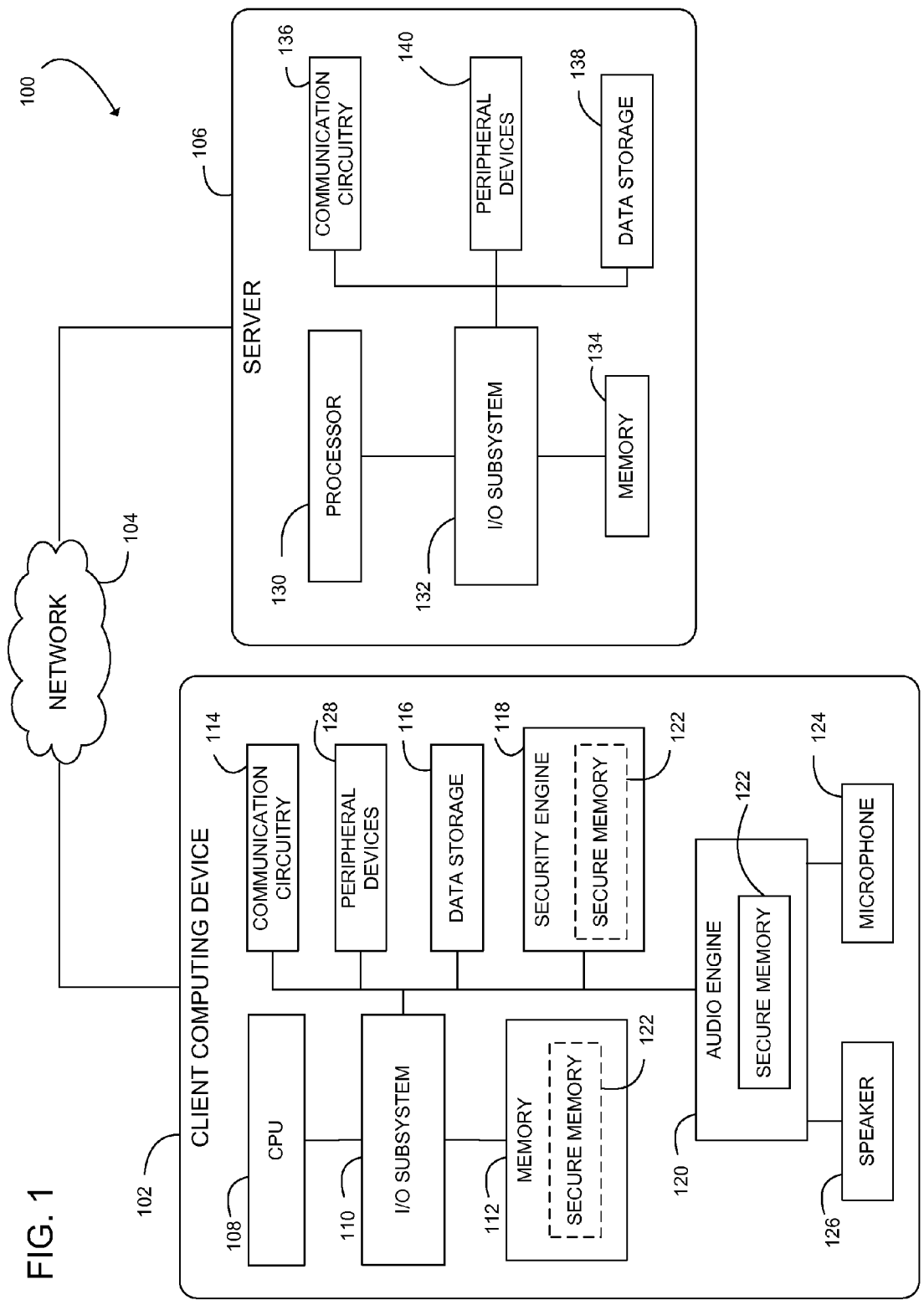
FIG. 1 is a simplified block diagram of at least one embodiment of a system for secure end-to-end audio recognition.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for secure end-to-end audio recognition includes a client computing device 102 and a server 106. In use, as discussed in more detail below, the client computing device 102 may securely capture audio via a microphone 124 and render audio via a speaker 126. Additionally, the client computing device 102 may securely transfer audio to the server 106 via a network 104. To facilitate such secure transfer, the client computing device 102 and the server 106 exchange cryptographic keys and establish a secure connection. Although only one client computing device 102, one network 104, and one server 106 are illustratively shown in FIG. 1, the system 100 may include a plurality of client computing devices 102, networks 104, and servers 106 in other embodiments. For example, in some embodiments, one server 106 may communicate with several client computing devices 102 over several networks 104.

The client computing device 102 may be embodied as any type of computing device capable of performing the functions described herein. For example, the client computing device 102 may be embodied as a desktop computer, a laptop computer, a mobile internet device, a handheld computer, a smart phone, a personal digital assistant, a telephony device, enterprise-level server, or other computing device. In the illustrative embodiment of FIG. 1, the client computing device 102 includes a central processing unit (CPU) 108, an I/O subsystem 110, a memory 112, communication circuitry 114, a data storage device 116, a security engine 118, an audio engine 120, a microphone 124, a speaker 126, and one or more peripheral devices 128. Of course, the client computing device 102 may include other or additional components, such as those commonly found in a computing device (e.g., various input/output devices), in other embodiments. Additionally, in some embodiments, one or more of the illustrative components may be incorporated in, or otherwise from a portion of, another component. For example, the memory 112, or portions thereof, may be incorporated in the CPU 108 200 in some embodiments.

The CPU 108 may be embodied as any type of processor capable of performing the functions described herein. For example, the processor may be embodied as a single or multi-core processor(s), digital signal processor, microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the client computing device 102 such as operating systems, applications, programs, libraries, and drivers. The memory 112 is communicatively coupled to the CPU 108 via the I/O subsystem 110, which may be embodied as circuitry and/or components to facilitate input/output operations with the CPU 108, the memory 112, and other components of the client computing device 102. For example, the I/O subsystem 110 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 110 may form a portion of a system-on-a-chip (SoC) and be incorporated, along with the CPU 108, the memory 112, and other components of the client computing device, on a single integrated circuit chip.

The communication circuitry 114 of the client computing device 102 may be embodied as any number of devices and circuitry for enabling communications between the client computing device 102 and remote computing devices (e.g., the server 106) over the network 104. The network 104 may be embodied as any number of various wired and/or wireless communication networks. For example, the network 104 may be embodied as or otherwise include a local area network (LAN), a wide area network (WAN), or a publicly-accessible, global network such as the Internet. Additionally, the network 104 may include any number of additional devices to facilitate communication between the client computing device 102 and the server 106. The client computing device 102 and the server 106 may use any suitable communication protocol to communicate with one another over the network(s) 104 depending on, for example, the particular type of network(s) 104.

The data storage device(s) 116 may be embodied as any type of device or devices configured for the short-term or long-term storage of data such as, for example, memory devices and circuits, memory cards, hard disk drives, solid-state drives, or other data storage devices. For example, as discussed in more detail below, one or more cryptographic keys may be stored in a secure location of the data storage device 116 for use in encrypting and decrypting audio data.

In the illustrative embodiment of FIG. 1, the security engine 118 is embodied as a security co-processor of the client computing device 102 that may be executed to perform security and cryptographic procedures to securely capture, render, and transfer audio data. In other embodiments, the security engine 118 may be embodied as, or otherwise include, a cryptographic accelerator incorporated into the CPU 108 or a stand-alone cryptographic software/firmware. In other embodiments, the security engine 118 may be executed by the CPU 108. As discussed in further detail below, the security engine 118 may use one or more cryptographic keys to encrypt and decrypt the audio data and may store the audio data in a secure memory 122. As such, the security engine 118 may access the cryptographic keys while performing cryptographic routines.

The audio engine 120 of the client computing device 102 may also be embodied as a co-processor of the client computing device 102. For example, in some embodiments, the audio engine 120 may include a low-power engine (LPE) and/or a digital signal processor (DSP). In other embodiments, the audio engine 120 and the security engine 118 may together form a portion of a system-on-a-chip (SoC). As discussed in more detail below, the audio engine 120 may include firmware or other instructions that enable the audio engine 120 to encode audio data captured from the microphone 124 and decode audio data to be rendered on the speaker 126. Furthermore, the audio engine 120 may access the secure memory 122. Although the secure memory 122 is shown in FIG. 1 as being embodied in the audio engine 120, in other embodiments, the secure memory 122 may be embodied in the security engine 118. Further, in other embodiments, the secure memory 122 may be embodied in a secure location or secure partition of the memory 112 of the client computing device 102. In the illustrative embodiment, the secure memory 122 is accessible by the security engine 118 and the audio engine 120 but is inaccessible by the central processing unit 108.

The peripheral devices 128 of the client computing device 102 may include any number of peripheral or interface devices. For example, the peripheral devices 128 may include a display, a keyboard, a mouse, external speakers, and/or other peripheral devices. The particular devices included in the peripheral devices 128 may depend upon, for example, the intended use of the client computing device 102. In the illustrative embodiment, the microphone 124 and the speaker 126 are communicatively coupled to the audio engine 120. Although only one microphone 124 and one speaker 126 are shown in the illustrative embodiment of FIG. 1, the client computing device 102 may include any number of microphones 124 and/or speakers 126.

The server 106 may be embodied as any type of data server or other computing device capable of performing the functions described herein. In the illustrative embodiment of FIG. 1, the server 106 includes a processor 130, an I/O subsystem 132, a memory 134, a communication circuitry 136, a data storage device 138, and one or more peripheral devices 140. In some embodiments, several of the foregoing components may be incorporated on a motherboard of the server 106, while other components may be communicatively coupled to the motherboard via, for example, a peripheral port. In some embodiments, the server 106 may also include a security engine similar to the security engine 118 of the client computing device 102. For example, the server 106 may include a security co-processor, a cryptographic accelerator incorporated into the processor 130, or a stand-alone cryptographic software/firmware, which may be executed by the processor 130 to perform various cryptographic functions as discussed below. Furthermore, it should be appreciated that the server 106 may include other components, sub-components, and devices commonly found in a server and/or computing device, which are not illustrated in FIG. 1 for clarity of the description.

The processor 130, the I/O subsystem 132, the memory 134, the communication circuitry 136, the data storage device 138, and the one or more peripheral devices 140 of the server 106 may be similar to the corresponding components of the client computing device 102 as described above. As such, the description of such similar components of the client computing device 102 is equally applicable to the similar components of the server 106 and are not repeated herein for clarity of the description.

Figure 2:
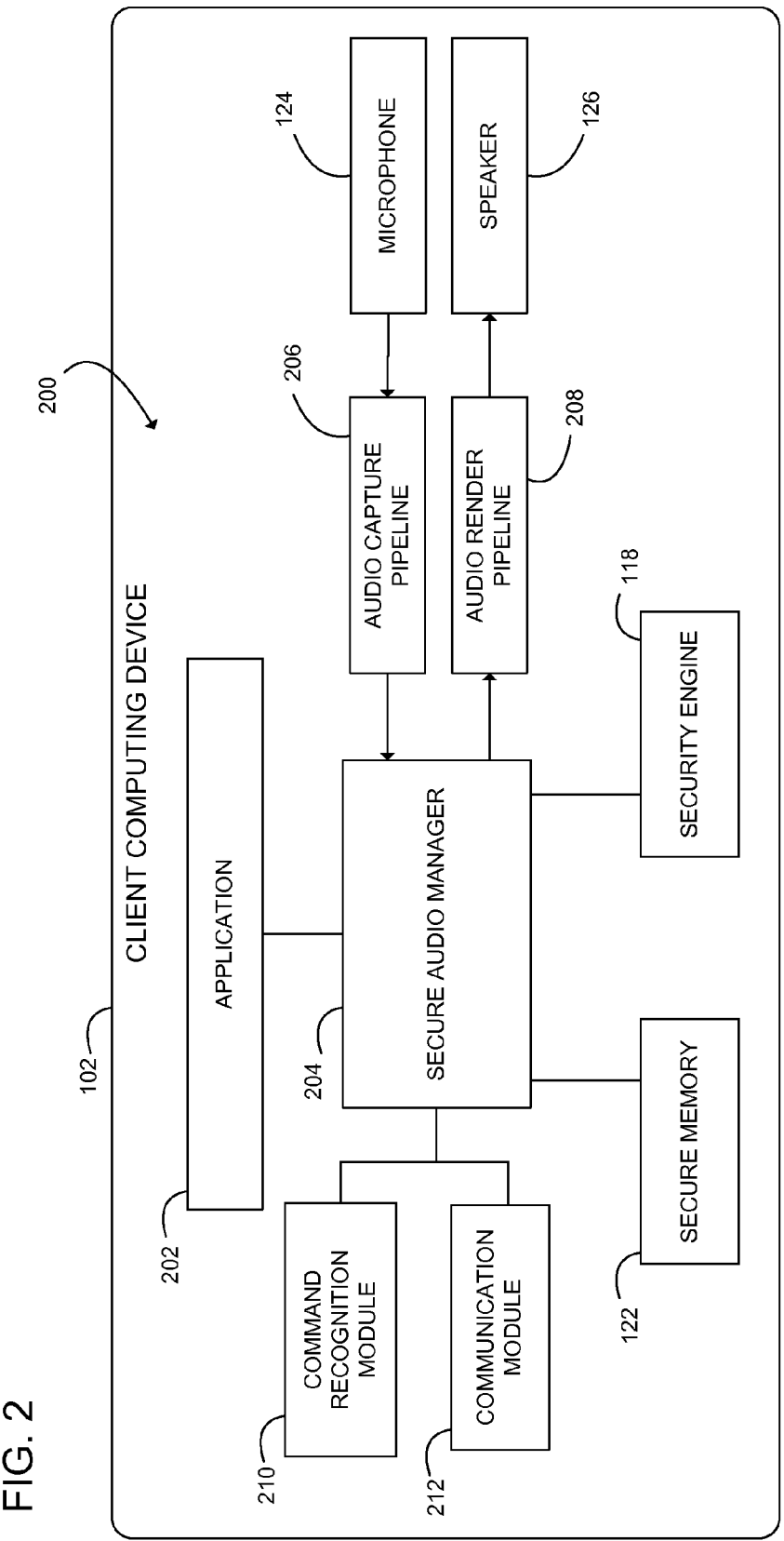
FIG. 2 is a simplified block diagram of at least one embodiment of an environment of a client computing device of the system of FIG. 1.

In use, as shown in FIG. 2, the client computing device 102 may establish an environment 200 for establishing secure voice authentication on the client computing device 102. The environment 200 in the illustrative embodiment includes the security engine 118, an application 202, a secure audio manager 204, an audio capture pipeline 206, an audio render pipeline 208, a command recognition module 210, and a communication module 212. As discussed above regarding FIG. 1, the security engine 118 may perform security and cryptographic procedures. As noted above, the security engine 118 may be embodied as, or otherwise include, a security co-processor, a cryptographic accelerator incorporated into the CPU 108, or a stand-alone cryptographic software/firmware executed by the CPU 108.

The application 202 may be executed by the client computing device 102 to transfer audio data to and from the server 106. In some embodiments, the application 202 may include an internet browser application, such as a hypertext markup language 5 (HTML5) or JavaScript application; a browser plug-in; or a standalone application (e.g., C, Java, etc.) running on the client computing device 102. The application 202 may be programmed in any language that would permit the functions described herein. Although the application 202 in FIG. 2 is embodied as a single application 202, the application 202 may be embodied as multiple applications 202. In other embodiments, the application 202 may act merely as a relay agent for facilitating the transfer of data (e.g., encrypted audio data packets) between the client computing device 102 and the server 106 over the network 104. Furthermore, in some embodiments, the application 202 may provide other authentication mechanisms in addition to the secure voice authentication discussed herein. In doing so, the application 202 may permit the use of multi-factor authentication systems including secure voice authentication. The application 202 may further provide a mechanism allowing a user of the client computing device 102 to enable/disable a secure voice mode of the audio engine 120. In such embodiments, the client computing device 102 may also perform voice authentication with remote computing devices that have not been enabled with secure voice authentication mechanisms. As discussed below, in some embodiments, the user of the client computing device 102 may request information from the client computing device 102 regarding whether the secure voice mode is enabled. Additionally, in some embodiments, the application 202 may allow the user of the client computing device 102 to customize audio commands registered in the audio engine 120 or the command recognition module 210.

In the illustrative embodiment of FIG. 2, the secure audio manager 204 may be executed by, or otherwise established on, the audio engine 120 to interface with the secure memory 122, the application 202, the audio capture pipeline 206, the audio render pipeline 208, the security engine 118, the command recognition module 210, and the communication module 212. As discussed in detail below, as the microphone 124 captures audio data, the secure audio manager 204 may transfer the audio data from the audio capture pipeline 206 to the secure memory 122 and instruct the security engine 118 to encrypt the audio data. The security engine 118 may then encrypt the audio data and store the encrypted audio data in the memory 112, which is accessible to the central processing unit 108. Similarly, prior to rendering the audio data on the speaker 126, the secure audio manager 204 may instruct the security engine 118 to decrypt the encrypted audio data. The security engine 118 may then decrypt the encrypted audio data and store the decrypted audio data in the secure memory 122. The secure audio manager 204 may then transfer the decrypted audio data from the secure memory 122 to the audio render pipeline 208 to be rendered on the speaker 126. The audio capture pipeline 206 and the audio render pipeline 208 may further be executed by the audio engine 120 to encode and decode the audio data, respectively. In doing so, the audio capture pipeline 206 and audio render pipeline 208 may use suitable audio encoding and decoding algorithms. Isolating the microphone and speaker audio data from the central processing unit 108 ensures that the audio data is processed securely and not easily accessed by malware.

In other embodiments, the secure audio manager 204 may be executed, or partially executed, by the CPU 108. However, it should be appreciated that in such embodiments the secure audio manager 204 does not have access to unencrypted audio data when the audio data is transferred to and from the secure memory 122. Rather, when capturing audio data, the secure audio manager 204 instructs the audio engine 120 to copy or transfer the captured audio data from the audio capture pipeline 206 to the secure memory 122 and subsequently instructs the security engine 118 to encrypt the audio data. Similarly, when rendering audio data, the secure audio manager 204 instructs the security engine 118 to decrypt the encrypted audio data and store the decrypted audio data in the secure memory 122, and subsequently instructs the audio engine 120 to retrieve the decrypted audio data for rendering.

In some embodiments, the command recognition module 210 may perform key-phrase recognition. As such, the command recognition module 210 may be configured to use voice trigger technology. In some embodiments, the command recognition module 210 may be preconfigured to recognize specific speech commands. For example, the user of the client computing device 102 may speak a command into the microphone 124 requesting a notification of whether the client computing device 102 is interacting with the server 106 in secure voice authentication mode. Similarly, the user may request information regarding, for example, the name of the application 202 being used, details regarding the public certificate of the server 106, and a list of available commands. In other embodiments, the user of the client computing device 102 may configure the command recognition module 210 to recognize the spoken commands of the user after a training period. As discussed above, in some embodiments, the commands recognized by the command recognition module 210 may be customized to perform an alternate function using the application 202. In other embodiments, the client computing device 102 may not include the command recognition module 210 but instead rely on the server 106 for key-phrase recognition analysis of the captured audio data.

The communication module 212 may handle the communication between the client computing device 102 and remote computing devices, including the server 106, through the network 104. The communication module 212 may utilize any suitable methodology or language, such as HTML5, to communicate with such remote computing devices. Each of the security engine 118, application 202, the secure audio manager 204, the audio capture pipeline 206, the audio render pipeline 208, the command recognition module 210, and the communication module 212 may be embodied as hardware, software, firmware, or a combination thereof.

Figure 3:
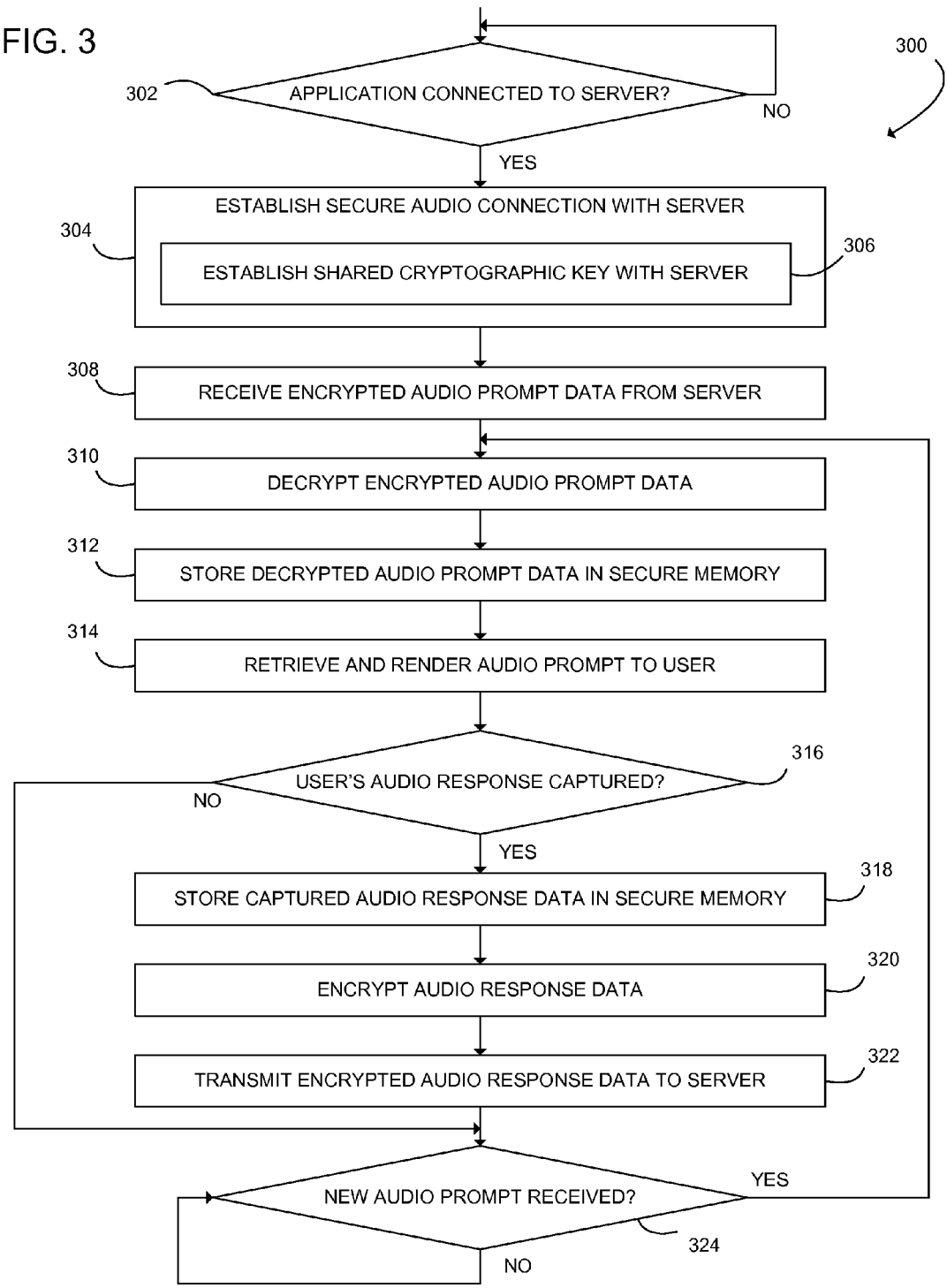
FIG. 3 is a simplified flow diagram of at least one embodiment of a method for establishing secure voice authentication on the client computing device of FIG. 1.
Figure 5:
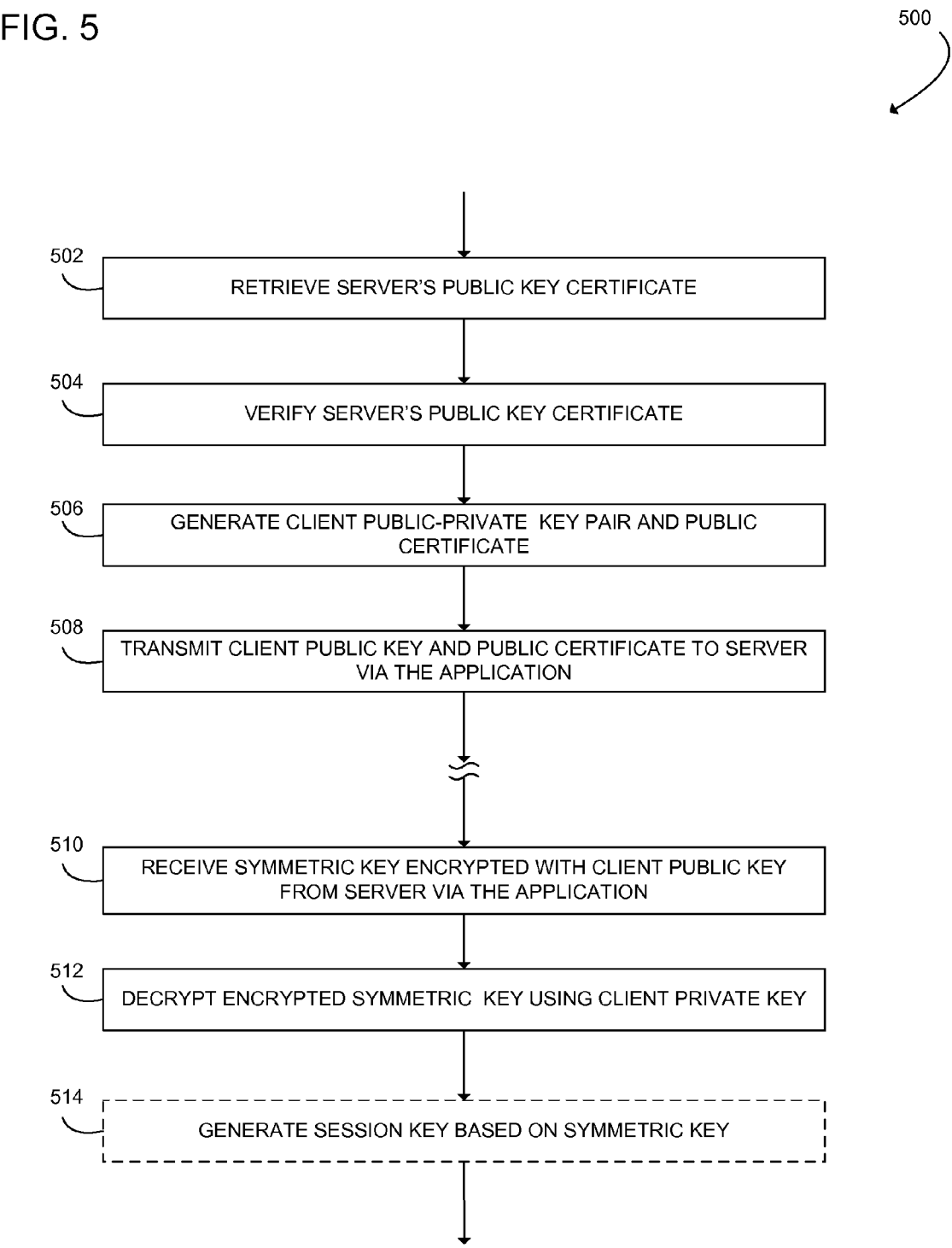
FIG. 5 is a simplified flow diagram of at least one embodiment of a method for establishing a shared cryptographic key with the server of FIG. 1 using the client computing device of FIG. 1.

Referring now to FIG. 3, one illustrative embodiment of a method 300 for establishing secure voice authentication, which may be executed by the client computing device 102, begins with block 302. In block 302, the client computing device 102 determines whether the application 202 is connected to the server 106. If so, the client computing device 102 establishes a secure audio connection with the server 106 in block 304. To do so, in block 306, the client computing device 102 may execute a method 500 to establish a shared cryptographic symmetric key with the server 106 as shown in FIG. 5. The method 500 begins with block 502 in which the application 202 retrieves the public key certificate of the server 106. In block 504, the client computing device 102 verifies the public key certificate of the server 106 using, for example, the security engine 118. In doing so, the security engine 118 may use any suitable scheme. For example, in embodiments in which a typical public key infrastructure (PKI) is used, the security engine 118 may verify the signature of the appropriate certificate authority.

In block 506, if the public key certificate of the server 106 is authentic, the security engine 118 may generate an asymmetric (public-private) key pair for the client computing device 102. It should be appreciated that each of a public key and private key is one half of an asymmetric key pair (i.e., public-private cryptographic key pair) as is well known in the art. The asymmetric key pair may be generated using any suitable cryptographic procedure. In various embodiments, the asymmetric key pair may be generated using a Rivest-Shamir-Adleman (RSA) algorithm or elliptic curve cryptography. In some embodiments, the client public-private key pair may be generated by the security engine 118 during idle time to reduce the load and latency of the system. Additionally, in block 506, the security engine 118 may include the client public key of the client public-private key pair in a public key certificate signed by a hardware private key of the client computing device 102. In some embodiments, the hardware private key may be associated with the security engine 118 and/or the audio engine 120 and may be stored in the secure memory 122. As discussed below (see discussion of FIG. 6), the hardware private key corresponds with a hardware public key, which may be stored, for example, in a public key database of the hardware component manufacturer or original equipment manufacturer (OEM). In other embodiments, the hardware public key may be stored in the memory 112 or the data storage device 116 of the client computing device 102. In such embodiments, the hardware public key may be managed by the application 202 rather than the server 106.

In block 508, the client computing device 102 may transmit the public key certificate with the client public key to the server 106 via the application 202. The client computing device 102 then may receive a cryptographic symmetric key encrypted with the client public key from the server 106 using the application 202 in block 510. It should be appreciated that in some embodiments there may be some delay between blocks 508 and 510 (indicated by the double-tilde symbol in FIG. 5) due to the server 106 verifying the public key certificate of the client computing device 102, generating the cryptographic symmetric key, and encrypting the cryptographic symmetric key. In block 512, the security engine 118 of the client computing device 102 may then decrypt the encrypted symmetric key using the client public key generated in block 506. In some embodiments, the client computing device 102 and the server 106 may use the cryptographic symmetric key as a shared key for encryption and decryption. In other embodiments, the shared cryptographic symmetric key may be used to derive additional symmetric keys for encrypting and signing subsequent audio data packets transmitted between the client computing device 102 and the server 106. In block 514, for example, the security engine 118 may generate a session key based on the shared cryptographic symmetric key.

Referring back to FIG. 3, in other embodiments, the client computing device 102 may establish a secure audio connection with the server 106 over the network 104 using another suitable methodology. Regardless, after establishing a secure audio connection with the server 106, the client computing device 102 receives encrypted audio prompt data from the server 106 in block 308. It should be appreciated that the audio prompt data is encrypted using the shared cryptographic key—the shared symmetric key or session key established in block 306 (e.g., via the method 500 of FIG. 5). In block 310, the security engine 118 of the client computing device 102 decrypts the encrypted audio prompt data using the shared cryptographic key and, in block 312, the security engine 118 stores the decrypted audio prompt data in the secure memory 122.

In block 314, the audio render pipeline 208 retrieves the decrypted audio prompt data from the secure memory 122 and plays the audio prompt to the user of the client computing device 102 through the speaker 126. As discussed above, the audio render pipeline 208 may decode the decrypted audio prompt data using a suitable decoding algorithm prior to outputting the data to the speaker 126. In block 316, the client computing device 102 determines whether the user's response to the audio prompt of the server 106 has been captured through the microphone 124. If not, in some embodiments, the method 300 advances to block 324 in which the client computing device 102 waits until a new audio prompt is received from the server 106. In doing so, the client computing device 102 may wait for a predetermined duration before "timing out" and proceeding to block 324. In other embodiments, the client computing device 102 may simply wait until the user has responded to proceed to block 318. However, if the user's audio response has been captured by the microphone 124, the audio response is transferred from the audio capture pipeline 206 to the secure memory 122 in block 318. The user's audio response may be, for example, a spoken key-phrase or a sound generated by a device (e.g., a key fob). For example, in some embodiments, the spoken key-phrase may be compared to a key-phrase registered with the server 106 to authenticate the user. In other embodiments, the user may use a key fob or other device to generate a specific sound that is recognizable by the server 106. In some embodiments, the user may use a device to generate an audio signal that is, for example, outside of the frequencies audible to humans. In such embodiments, the client computing device 102 may include a suitable microphone 124 for capturing the signal.

As discussed above, in block 318, the audio capture pipeline 206 may encode the captured audio response data prior to storing it in the secure memory 122. In block 320, the security engine 118 of the client computing device 102 encrypts the audio response data using the shared cryptographic key. Thereafter, in block 322, the client computing device 102 transfers the encrypted audio response data to the server 106 using the application 202. The client computing device 102 then waits until a new audio prompt is received from the server 106 in block 324. If a new audio prompt is received, the method 300 returns to block 310 to decrypt the new encrypted audio prompt data using the security engine 118.

As discussed above, the method 300 may be used by the client computing device 102 to establish secure voice authentication. For example, in some embodiments, the server 106 may prompt the user of the client computing device 102 for a username. The user may respond to the audio prompt through the microphone 124, which may be securely transmitted to the server 106. The server 106 may then verify the spoken username using, for example, an audio recognition module similar to the command recognition module 210 of the client computing device 102. Further, the server 106 may also verify the authenticity of the user's voice itself. Thereafter, the server 106 may request the user's password, and the user may similarly respond via the microphone 124. As such, secure multi-factored authentication systems may include both a username-password pair and voice verification in addition to other authentication mechanisms, while simultaneously permitting hands-free interaction with the client computing device 102. In other embodiments, the server 106 may provide an audio prompt, including options from which the user may select. It should be appreciated that, in some embodiments, the method 300 may require the user of the client computing device 102 to register for secure voice authentication. For example, the user may be asked to train a username and passphrase acoustic model with the user's voice.

It should be appreciated that, in some embodiments, the client computing device 102 may utilize the methods described herein without interaction of the server 106. For example, in some embodiments, the client computing device 102 may execute an application in which secure audio is desired between the application and audio engine 120 to ensure no rogue or malicious application can intercept the audio. An example of such an embodiment may include the execution of an application involving local speech processing and/or speech recognition in which the user desires to protect his or her interaction with the application. For example, if a speech recognition application is used to perform internet searches, the user may want to prevent the audio data from being intercepted or exfiltrated. In such embodiments, the local application may establish a secured execution environment and manage local cryptographic keys used with the audio engine 120 to transmit the audio to the application in a secure manner (e.g., the local application may operate as a local proxy server and perform a method similar to the server methods 400 and 600 described below in regard to FIGS. 4 and 6, respectively). Of course, local management of the cryptographic functions may be less secure. As such, the application executed on the client computing device 102 may use one or more tamper resistance mechanisms to protect the cryptographic keys such as a secure enclave technology or the like.

Figure 4:
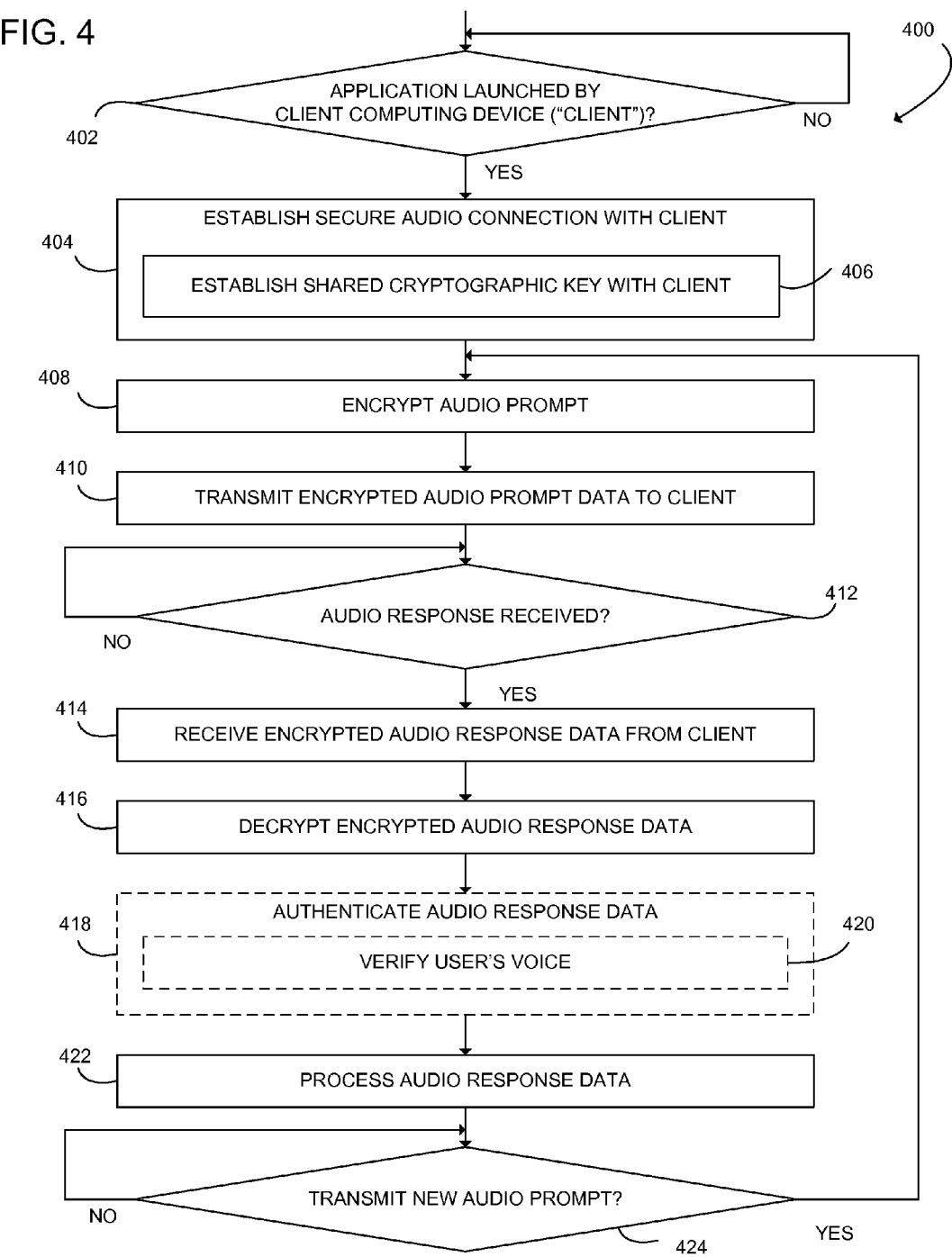
FIG. 4 is a simplified flow diagram of at least one embodiment of a method for securely verifying audio responses received from client computing devices in response to audio prompts on the server of FIG. 1.
Figure 6:
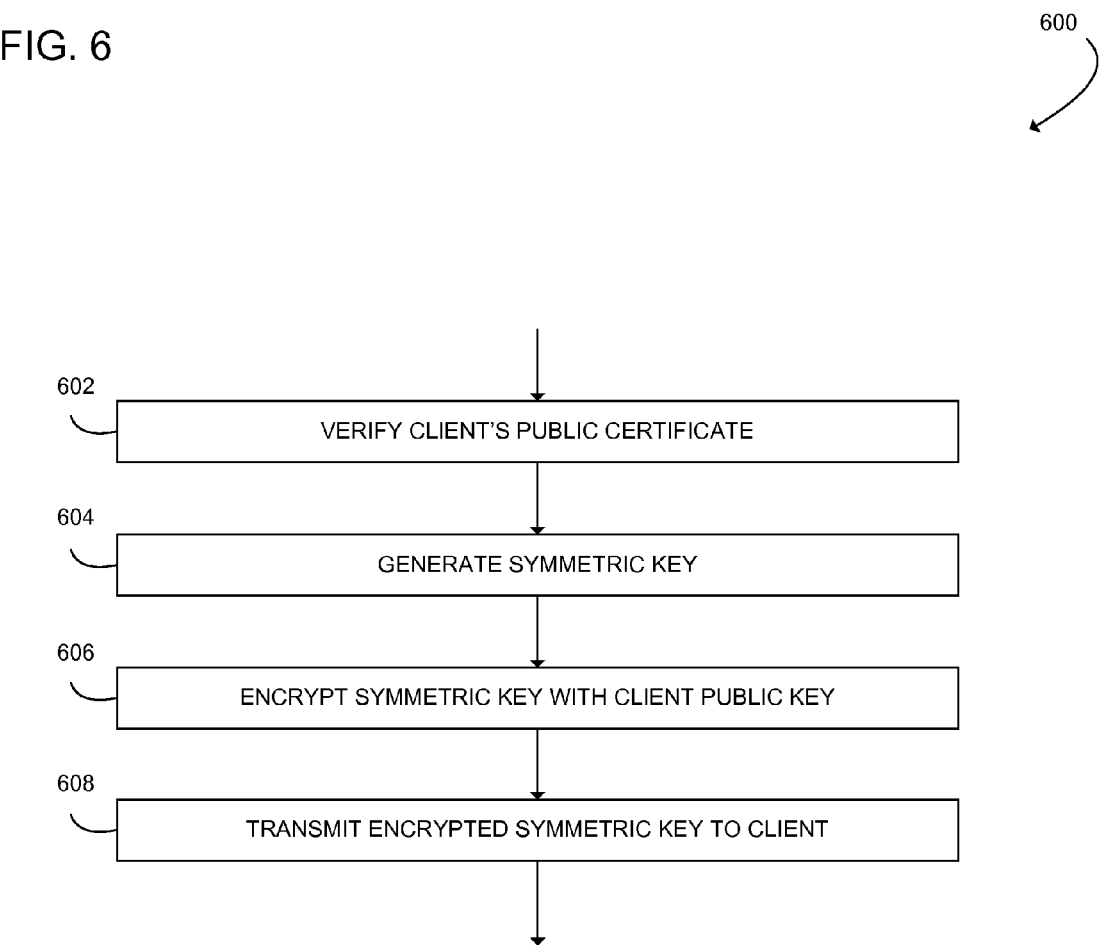
FIG. 6 is a simplified flow diagram of at least one embodiment of a method for establishing a shared cryptographic key with the client computing device of FIG. 1 using the server of FIG. 1.

Referring now to FIG. 4, one illustrative embodiment of a method 400 for securely verifying audio responses received from client computing devices in response to audio prompts on the server, which may be executed by the server 106, begins with block 402. In block 402, the server 106 determines whether the client computing device 102 has launched the application 202. In other words, the server 106 determines whether it is connected to the client computing device 102 through the application 202. If so, the server 106 establishes a secure audio connection with the client computing device 102 in block 404. To do so, in block 406, the server 106 may execute a method 600 to establish a shared cryptographic symmetric key with the client computing device 102 as shown in FIG. 6.

The method 600 begins with block 602 in which the server 106 verifies the public key certificate of the client computing device 102. As discussed above (see blocks 506 and 508 of FIG. 5), the public key certificate of the client computing device 102 contains a client public key and is signed by a hardware private key. The hardware private key is associated with one of the hardware components of the client computing device 102 such as the security engine 118 or the audio engine 120. It should be appreciated that the hardware private key is one half of an asymmetric key pair (i.e., public-private cryptographic key pair), the other half being the hardware public key. In the illustrative embodiment, the hardware public key is stored in a public key database of the hardware component manufacturer. As such, the server 106 requests the hardware public key from the hardware component manufacturer and uses the hardware public key to verify the public key certificate of the client computing device 102. After verification, the server 106 can trust that the public key certificate and client public key do, in fact, belong to the client computing device 102.

Subsequently, in block 604, the server 106 generates a symmetric cryptographic key to be used as a shared cryptographic key with the client computing device 102. The symmetric key may be generated using any suitable cryptographic procedure. For example, the symmetric key may be generated using a Data Encryption Standard (DES) algorithm, a Triple-DES algorithm, an Advanced Encryption Standard (AES) algorithm, or any other suitable symmetric encryption algorithm. Similarly, the symmetric key may be a block cipher or a stream cipher. In some embodiments, the symmetric key may be embodied as a session key generated from, or as a function of, another cryptographic key. Additionally, in some embodiments, the symmetric key may not be generated on the server 106 but instead generated on another computing device and securely transmitted to the server 106.

In block 606, the server 106 encrypts the symmetric cryptographic key with the client public key received with the public key certificate of the client computing device 102. The server 106 may then transmit the encrypted symmetric cryptographic key to the client computing device 102 in block 608. As discussed above, the client computing device 102 may then decrypt the encrypted symmetric cryptographic key using the client private key and, thereafter, the server 106 and the client computing device 102 may use the symmetric cryptographic key as a shared key for encryption and decryption of audio data packets and other data transferred between the two devices.

Referring back to FIG. 4, in other embodiments, the server 106 may establish a secure audio connection with the client computing device 102 over the network 104 using another methodology. Regardless, in block 408, the server 106 encrypts an audio prompt using the shared cryptographic key of the server 106 and the client computing device 102. As discussed above, in doing so, the server 106 may use a security engine. In block 410, the server 106 transmits the encrypted audio prompt data to the client computing device 102 through the application 202. In block 412, the server 106 waits until an audio response is received from the client computing device 102. Once the server 106 receives encrypted audio response data from the client computing device 102 in block 414, the server 106 decrypts the encrypted audio response data using the shared symmetric cryptographic key (or shared session key) in block 416.

As discussed above, in some embodiments, the server 106 may authenticate the audio response data received from the client computing device 102 in block 418. In doing so, the server 106 may, for example, use a speech recognition module to compare a key-phrase spoken by the user of the client computing device 102 to a phrase registered with the server 106 or the application 202. Further, the server 106 may verify the user's voice in block 420 using any suitable voice analysis mechanism. In some embodiments, the user of the client computing device 102 may provide a number of audio responses to the server 106 for authentication. After authentication, the server 106 may proceed through method 400 without again authenticating the audio response data in block 418. For example, after authenticating the user, the server 106 may prompt the user with a number of menu options unrelated to authenticated the user. Similarly, in some embodiments, the user's voice may only be verified at the outset (i.e., during the initial audio response authentication). However, in other embodiments, the user's voice may verified in each iteration of the method 400. As such, the server 106 may use the voice verification mechanism to ensure the continued presence of the registered user in some embodiments.

In block 422, the server 106 processes the audio response data. That is, the server 106 determines what action to take based on the audio response of the user of the client computing device 102. In block 424, the server 106 determines whether to transmit a new audio prompt to the client computing device 102. In some embodiments, the determination may be a function of the user's audio response in block 422. In other embodiments, the server 106 may transmit a new audio prompt to the client computing device 102 after having not received encrypted audio response data from the client computing device 102 within a predetermined duration. For example, the server 106 may remind the user of the selections available. If the server 106 determines to transmit a new audio prompt, the method 400 returns to block 408 to encrypt the audio prompt data with the shared symmetric cryptographic key established in block 406.

EXAMPLES

Illustrative examples of the devices, systems, and methods disclosed herein are provided below. An embodiment of the devices, systems, and methods may include any one or more, and any combination of, the examples described below.

Example 1 includes a computing device for establishing secure voice authentication. The computing device includes a central processing unit; a main memory that is accessible by the central processing unit; a secure memory that is inaccessible by the central processing unit; a speaker; a microphone; a communication module to receive an encrypted audio prompt from a server; a security engine to decrypt the encrypted audio prompt and store the decrypted audio prompt in the secure memory; and an audio engine to (i) retrieve the decrypted audio prompt from the secure memory, (ii) render the decrypted audio prompt on the speaker, (iii) capture an audio response generated by the microphone, and (iv) store the captured audio response in the secure memory, wherein the security engine to further (i) retrieve the captured audio response from the secure memory, (ii) encrypt the audio response, and (iii) store the encrypted audio response in the main memory, wherein the communication module to further transmit the encrypted audio response to the server.

Example 2 includes the subject matter of Example 1, and wherein the audio engine further comprises an audio render pipeline.

Example 3 includes the subject matter of any of Examples 1 and 2, and wherein the audio render pipeline is to render the decrypted audio prompt on the speaker in response to the audio render pipeline decoding the decrypted audio prompt.

Example 4 includes the subject matter of any of Examples 1-3, and wherein the audio engine further comprises an audio capture pipeline.

Example 5 includes the subject matter of any of Examples 1-4, and wherein the audio capture pipeline is to store the captured audio response in the secure memory in response to the audio capture pipeline encoding the captured audio response.

Example 6 includes the subject matter of any of Examples 1-5, and wherein the security engine further comprises the secure memory.

Example 7 includes the subject matter of any of Examples 1-6, and further includes a command recognition module to correlate the captured audio response with one or more registered audio commands of the client computing device.

Example 8 includes the subject matter of any of Examples 1-7, and wherein the communication module is to receive the encrypted audio prompt and transmit the encrypted audio response using Hypertext Markup Language 5.

Example 9 includes a method for establishing secure voice authentication on a client computing device. The method includes receiving, on the computing device, an encrypted audio prompt from a server, the audio prompt requesting a response from a user of the client computing device; decrypting, using a security engine of the client computing device, the encrypted audio prompt; storing, using the security engine, the decrypted audio prompt in a secure memory that is inaccessible by a central processing unit of the client computing device; retrieving, with an audio engine of the computing device, the decrypted audio prompt from the secure memory; rendering, using the audio engine, the decrypted audio prompt on a speaker of the client computing device; capturing, with the audio engine, an audio response generated by a microphone of the client computing device; storing, using the audio engine, the captured audio response in the secure memory; encrypting the audio response using the security engine; storing, using the security engine, the encrypted audio response in a memory of the client computing device that is accessible by the central processing unit; and transmitting the encrypted audio response to the server.

Example 10 includes the subject matter of Example 9, and wherein receiving the encrypted audio prompt from the server comprises receiving the encrypted audio prompt with an audio recognition application of the client computing device.

Example 11 includes the subject matter of any of Examples 9 and 10, and wherein the security engine comprises a processor of the client computing device.

Example 12 includes the subject matter of any of Examples 9-11, and wherein storing the decrypted audio prompt in the secure memory comprises storing the decrypted audio prompt in a secure memory of the security engine.

Example 13 includes the subject matter of any of Examples 9-12, and wherein decrypting the encrypted audio prompt comprises decrypted the encrypted audio prompt using a cryptographic key shared with the server.

Example 14 includes the subject matter of any of Examples 9-13, and wherein encrypting the audio response comprises encrypting the audio response using a cryptographic key shared with the server.

Example 15 includes the subject matter of any of Examples 9-14, and further includes encoding, with the audio engine, the captured audio response, wherein storing the captured audio response in the secure memory comprises storing the encoded captured audio response.

Example 16 includes the subject matter of any of Examples 9-15, and further includes decoding, with the audio engine, the decrypted audio prompt, wherein rendering the decrypted audio prompt on the speaker comprises rendering the decoded decrypted audio prompt.

Example 17 includes the subject matter of any of Examples 9-16, and further includes securely establishing a shared symmetric cryptographic key with the server.

Example 18 includes the subject matter of any of Examples 9-17, and wherein securely establishing a shared symmetric cryptographic key with the server comprises generating a private-public key pair comprising a client public key and a client private key; transmitting the client public key, with a public key certificate signed by a public key corresponding with a private key stored in the security engine, to the server; and decrypting the shared symmetric cryptographic key using the client private key.

Example 19 includes the subject matter of any of Examples 9-18, and further includes correlating the audio response with a registered audio command.

Example 20 includes the subject matter of any of Examples 9-19, and wherein receiving the encrypted audio prompt and transmitting the encrypted audio response comprises receiving the encrypted audio prompt and transmitting the encrypted audio response using Hypertext Markup Language 5.

Example 21 includes a computing device having a processor and a memory having stored therein a plurality of instructions that when executed by the processor cause the computing device to perform the method of any of Examples 9-20.

Example 22 includes one or more machine readable storage media comprising a plurality of instructions stored thereon that in response to being executed result in a computing device performing the method of any of Examples 9-20.

Example 23 includes a method for securely capturing audio on a computing device. The method includes capturing, with an audio engine of the computing device, audio data generated by a microphone of the computing device; storing, using the audio engine, the captured audio data in a secure memory that is inaccessible by a central processing unit of the computing device; retrieving, with a security engine of the computing device, the captured audio data from the secure memory; encrypting, using the security engine, the retrieved audio data; and storing the encrypted audio data in a memory of the computing device that is accessible by the central processing unit of the computing device.

Example 24 includes the subject matter of Example 23, and wherein capturing, with the audio engine of the computing device, audio data generated by the microphone of the computing device comprises capturing, with an audio capture pipeline of the computing device, audio data generated by a microphone of the computing device.

Example 25 includes the subject matter of any of Examples 23 and 24, and further includes encoding, with the audio capture pipeline, the captured audio data.

Example 26 includes subject matter of any of Examples 23-25, and wherein the security engine comprises a processor of the computing device.

Example 27 includes subject matter of any of Examples 23-26, and wherein retrieving the captured audio data from the secure memory comprises retrieving the captured audio data from secure memory of the security engine.

Example 28 includes a computing device having a processor and a memory having stored therein a plurality of instructions that when executed by the processor cause the computing device to perform the method of any of Examples 23-27.

Example 29 includes one or more machine readable storage media comprising a plurality of instructions stored thereon that in response to being executed result in a computing device performing the method of any of Examples 23-28.

Example 30 includes a method for securely rendering audio on a computing device. The method includes receiving, with an audio engine of the computing device, encrypted audio data from an application executed on the computing device; decrypting, using a security engine of the computing device, the encrypted audio data; storing, using the security engine, the decrypted audio data in a secure memory that is inaccessible by a central processing unit of the computing device; retrieving, with the audio engine of the computing device, the decrypted audio data from the secure memory; and rendering, using the audio engine, the decrypted audio data on a speaker of the computing device.

Example 31 includes the subject matter of Example 30, and wherein receiving, with the audio engine of the computing device, the encrypted audio data comprises receiving, with an audio render pipeline of the computing device, encrypted audio data.

Example 32 includes the subject matter of any of Example 30 and 31, and further includes decoding, with the audio render pipeline, the decrypted audio data.

Example 33 includes the subject matter of any of Examples 30-32, and wherein the security engine comprises a processor of the computing device.

Example 34 includes the subject matter of any of Examples 30-33, and wherein storing the decrypted audio data in the secure memory comprises storing the decrypted audio data in a secure memory of the security engine.

Example 35 includes a computing device having a processor and a memory having stored therein a plurality of instructions that when executed by the processor cause the computing device to perform the method of any of Examples 30-34.

Example 36 includes one or more machine readable storage media comprising a plurality of instructions stored thereon that in response to being executed result in a computing device performing the method of any of Examples 30-35.

Example 37 includes a method for securely verifying audio responses received from client computing devices in response to audio prompts on a server. The method includes establishing a shared symmetric cryptographic key with a client computing device; encrypting an audio prompt using the symmetric cryptographic key, the audio prompt configured to be rendered on a speaker of the computing device; transmitting the encrypted audio prompt to the client computing device; receiving an encrypted audio response from the client computing device in response to the encrypted audio prompt; decrypting the encrypted audio response using the symmetric cryptographic key; and processing the decrypted audio response.

Example 38 includes the subject matter of Example 37, and wherein establishing a shared symmetric cryptographic key with the client computing device comprises receiving a client public key with a public key certificate from the client computing device, the public key certificate including a public key corresponding with a private key stored in the security engine of the client computing device; verifying the public key certificate; generating the shared symmetric cryptographic key; encrypting the symmetric cryptographic key with the client public key; and transmitting the encrypted shared symmetric cryptographic key to the client computing device.

Example 39 includes the subject matter of any of Examples 37 and 38, and wherein processing the decrypted audio response comprises generating a new audio prompt to be transmitted to the client computing device.

Example 40 includes the subject matter of any of Examples 37-39, and further includes authenticating the audio response.

Example 41 includes the subject matter of any of Examples 37-40, and wherein authenticating the audio response comprises verifying a user's voice in the audio response.

Example 42 includes a computing device having a processor and a memory having stored therein a plurality of instructions that when executed by the processor cause the computing device to perform the method of any of Examples 37-41.

Example 43 includes one or more machine readable storage media comprising a plurality of instructions stored thereon that in response to being executed result in a computing device performing the method of any of Examples 37-41.

The invention claimed is:

1. A computing device for securely transferring audio, the computing device comprising:
a central processing unit;
a system memory that is accessible by the central processing unit;
a secure memory that is inaccessible by the central processing unit;
a speaker to output audio based on received audio data;
an audio co-processor to receive encrypted audio data from an application executed on the computing device; and
a security co-processor to (i) decrypt the encrypted audio data and (ii) store the decrypted audio data in the secure memory;
wherein the audio co-processor is further to retrieve the decrypted audio data from the secure memory and (ii) provide the decrypted audio data to the speaker for output;
wherein access to the decrypted audio data requires access to the secure memory.

2. The computing device of claim 1, wherein the audio co-processor includes the secure memory.

3. The computing device of claim 1, wherein the security co-processor includes the secure memory.

4. The computing device of claim 1, further comprising a microphone to generate audio data based on captured audio;
wherein the audio co-processor is further to (i) receive the audio data generated by the microphone and (ii) store the received audio data in the secure memory; and
wherein the security co-processor is further to (i) retrieve the captured audio data from the secure memory, (ii) encrypt the captured audio data, and (iii) store the encrypted audio data in the system memory.

5. The computing device of claim 4, wherein the encrypted audio data received from the application comprises an audio prompt to a user of the computing device.

6. The computing device of claim 5, wherein the received audio data comprises an audio response of the user to the audio prompt.

7. The computing device of claim 1, further comprising a secure audio render pipeline inaccessible by the central processing unit by which to transfer the decrypted audio data from the secure memory to the speaker, wherein audio data in the secure audio render pipeline is inaccessible by the central processing unit.

8. A method for securely transferring audio on a computing device, the method comprising:
receiving, with an audio co-processor different from a central processing unit of the computing device, encrypted audio data from an application executed on the computing device;
decrypting, by a security co-processor different from the central processing unit, the encrypted audio data;
storing, by the security co-processor, the decrypted audio data in a secure memory inaccessible by the central processing unit;
retrieving, with the audio co-processor of the computing device, the decrypted audio data from the secure memory; and
providing, by the audio co-processor, the decrypted audio data to a speaker of the computing device for output;
wherein access to the decrypted audio data requires access to the secure memory.

9. The method of claim 8, wherein storing the decrypted audio data comprises storing the decrypted audio data in a secure memory of the audio co-processor; and
wherein retrieving the decrypted audio data from the secure memory comprises retrieving the decrypted audio data from the secure memory of the audio co-processor.

10. The method of claim 8, wherein storing the decrypted audio data comprises storing the decrypted audio data in a secure memory of the security co-processor; and
wherein retrieving the decrypted audio data from the secure memory comprises retrieving the decrypted audio data from the secure memory of the security co-processor.

11. The method of claim 8, further comprising:
capturing, with the audio co-processor, audio data generated by a microphone;

storing, by the audio co-processor, the captured audio data in the secure memory;

retrieving, with the security co-processor, the captured audio data from the secure memory;

encrypting, by the security co-processor, the retrieved audio data; and storing the encrypted audio data in a system memory that is accessible by the central processing unit.

12. The method of claim 8, further comprising establishing a secure audio render pipeline inaccessible by the central processing unit by which to transfer the decrypted audio data from the secure memory to the speaker, wherein audio data in the secure audio render pipeline is inaccessible by the central processing unit.

13. A computing device for securely capturing audio, the computing device comprising:

a central processing unit;

a system memory that is accessible by the central processing unit;

a secure memory that is inaccessible by the central processing unit;

a microphone to generate audio data based on captured audio;

an audio co-processor to (i) receive the generated audio data and (ii) store the received audio data in the secure memory; and a security co-processor to (i) retrieve the stored audio data from the secure memory (ii) encrypt the retrieved audio data and (iii) store the encrypted audio data in the system memory;

wherein access to unencrypted audio data requires access to the secure memory.

14. The computing device of claim 13, wherein the audio co-processor includes the secure memory.

15. The computing device of claim 13, wherein the security co-processor includes the secure memory.

16. The computing device of claim 13, further comprising a secure audio capture pipeline inaccessible by the central processing unit by which to transfer the audio data generated by the microphone from the microphone to the secure memory, wherein audio data in the secure audio capture pipeline is inaccessible by the central processing unit.

17. A method for securely capturing audio on a computing device, the method comprising:

capturing, with an audio co-processor different from a central processing unit of the computing device, audio data generated by a microphone;

storing, by the audio co-processor, the captured audio data in a secure memory inaccessible by the central processing unit;

retrieving, with a security co-processor different from the central processing unit, the stored audio data from the secure memory;

encrypting, by the security co-processor, the retrieved audio data; and storing the encrypted audio data in a system memory that is accessible by the central processing unit;

wherein access to unencrypted audio data requires access to the secure memory.

18. The method of claim 17, wherein storing the captured audio data in the secure memory comprises storing the captured audio data in a secure memory of the audio co-processor; and wherein retrieving the captured audio data from the secure memory comprises retrieving the captured audio data from the secure memory of the audio co-processor.

19. The method of claim 17, wherein storing the captured audio data in the secure memory comprises storing the captured audio data in a secure memory of the security co-processor; and wherein retrieving the captured audio data from the secure memory comprises retrieving the captured audio data from the secure memory of the security co-processor.

20. The method of claim 17, further comprising establishing a secure audio capture pipeline inaccessible by the central processing unit by which to transfer the audio data generated by the microphone from the microphone to the secure memory, wherein audio data in the secure audio capture pipeline is inaccessible by the central processing unit.

* * * * *